(12) United States Patent
Hernacki et al.

(10) Patent No.: US 8,255,517 B1
(45) Date of Patent: Aug. 28, 2012

(54) METHOD AND APPARATUS TO DETERMINE DEVICE MOBILITY HISTORY

(75) Inventors: Brian Hernacki, San Carlos, CA (US); Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 622 days.

(21) Appl. No.: 11/477,503

(22) Filed: Jun. 29, 2006

(51) Int. Cl.
*G06F 15/173* (2006.01)

(52) U.S. Cl. .............. 709/224; 709/225; 726/2; 726/22; 726/23; 726/24; 726/25

(58) Field of Classification Search .......... 709/224–225; 726/2, 22–25
See application file for complete search history.

(56) References Cited

U.S. PATENT DOCUMENTS

| | | | |
|---|---|---|---|
| 7,490,356 B2* | 2/2009 | Lieblich et al. | 726/25 |
| 7,865,956 B1* | 1/2011 | Cambridge et al. | 726/24 |
| 2004/0064731 A1* | 4/2004 | Nguyen et al. | 713/201 |
| 2006/0195905 A1* | 8/2006 | Fudge | 726/25 |
| 2007/0143824 A1* | 6/2007 | Shahbazi | 726/1 |
| 2007/0240215 A1* | 10/2007 | Flores et al. | 726/24 |

OTHER PUBLICATIONS

Ito, Kimihito, et al., "A Visual Environment for Dynamic Web Application Composition", Aug. 26-30, 2003, ACM, pp. 184-193.*

* cited by examiner

*Primary Examiner* — Moustafa M Meky
*Assistant Examiner* — Michael C Lai
(74) *Attorney, Agent, or Firm* — Wilmer Cutler Pickering Hale and Dorr LLP

(57) ABSTRACT

A method, system and computer-readable medium for securing access between a mobile computing device and a network computer is described. The method comprises upon a connection by the mobile computing device to a network or a device, recording the connection in a history database and processing the history database to assign a risk level to the mobile computing device. The system comprises the mobile computing device comprising a connection history collection agent for collecting information about a computing environment and the host computer comprising wireless environment data derived from the collected information where the host computer uses the wireless environment data to grant or deny a connection to the mobile computing device.

17 Claims, 4 Drawing Sheets

METHOD AND APPARATUS TO DETERMINE DEVICE MOBILITY HISTORY

BACKGROUND OF THE INVENTION

1. Field of the Invention

Embodiments of the present invention generally relate to network security and, more particularly, to a method and apparatus for determining a security risk posed by a mobile device requesting a connection to a network.

2. Description of the Related Art

Highly mobile computing devices such as smartphones, personal digital assistants (PDAs) and ultra-mobile personal computers (UMPCs) have become ubiquitous in our society. People rely on these mobile computing devices as an integrated part of their daily lives. Very often, people bring these mobile computing devices from a secure workplace environment to a less secure home environment or another insecure environment.

By their very nature, mobile computing devices are designed to search for and connect to available computer networks. Mobile computing devices that are not properly secured may connect indiscriminately to any available computer network. BLUETOOTH enabled computing devices may connect to any other BLUETOOTH enabled device within close proximity. The user of the mobile computing device may be unaware the mobile computing device has connected to another computer network or to another mobile computing device.

Mobile computing devices are susceptible to computer viruses and malware attacks when placed into an unsecured environment. Further, these computer viruses can spread to a standard computer network environment, e.g., the user's workplace network, when the user returns with the mobile computing device to the secure workplace environment. Thus, an unsecured mobile computing device can function as a backdoor for a computer virus to enter into a secure network environment.

Mobile computing devices generally have less processing power than a standard computing device, e.g., a desktop or a laptop computer. Because of the limited processing power, scanning a mobile computing device for computer viruses is a time consuming process. As such, mobile devices generally do not have virus scanning programs resident on the device. As such, the scan burden is placed upon the user's desktop computer or server when synchronization is performed. The long scanning process interferes with the ability of the user to use the mobile computing device for minimal tasks such as synchronizing the mobile computing device to a desktop computer. Thus, there is a need in the art for a method and apparatus that provides security to a highly mobile computing device and to a computer network without negatively impacting the user experience.

SUMMARY OF THE INVENTION

The present invention is a method, apparatus, and computer readable medium for monitoring and assessing the promiscuity of a mobile device to determine the risk a device poses to its host network. The method comprises, upon a connection by a mobile computing device to a wireless network or a wireless device, recording the connection in a history database and processing the history database to assign a risk level to the mobile computing device. The system comprises the mobile computing device comprising a connection history collection agent for collecting information about a computing environment and the host computer comprising wireless environment data derived from the collected information where the host computer uses the wireless environment data to grant or deny a connection to the mobile computing device. An embodiment of the invention relates to a computer-readable medium having stored thereon a plurality of instructions, the plurality of instructions including instructions which, when executed by a processor, cause the processor to perform a method comprising: upon a connection by the mobile computing device to a network or a device, recording the connection in a history database; and processing the history database to assign a risk level to the mobile computing device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

While the invention is described herein by way of example using several embodiments and illustrative drawings, those skilled in the art will recognize that the invention is not limited to the embodiments of drawing or drawings described. It should be understood that the drawings and detailed description thereto are not intended to limit the invention to the particular form disclosed, but on the contrary, the invention is to cover all modification, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

The present invention is a method for assessing a risk level posed by a mobile computing device seeking access to a network computer. A connection history agent records each connection made by the mobile computing device to any wired or wireless network, or to another device. The connection history agent stores the connection information in a connection history database. Synchronization software processes the information in the connection history database to generate a risk level associated with the mobility of the mobile computing device. The greater the number of networks and devices connected to by the mobile computing device, i.e., the more promiscuous the device, the higher the risk level assigned to the mobile computing device by the synchronization software. It is assumed that a device that is very promiscuous has a high probability of carrying a virus or malware to the host network. The network computer utilizes the assigned risk level to grant or deny access to the mobile computing device. The risk level can also be used to initiate an appropriate action above a certain risk level, e.g., if the risk level is "high" an anti-virus scan is automatically performed on the mobile computing device.

Figure 1:
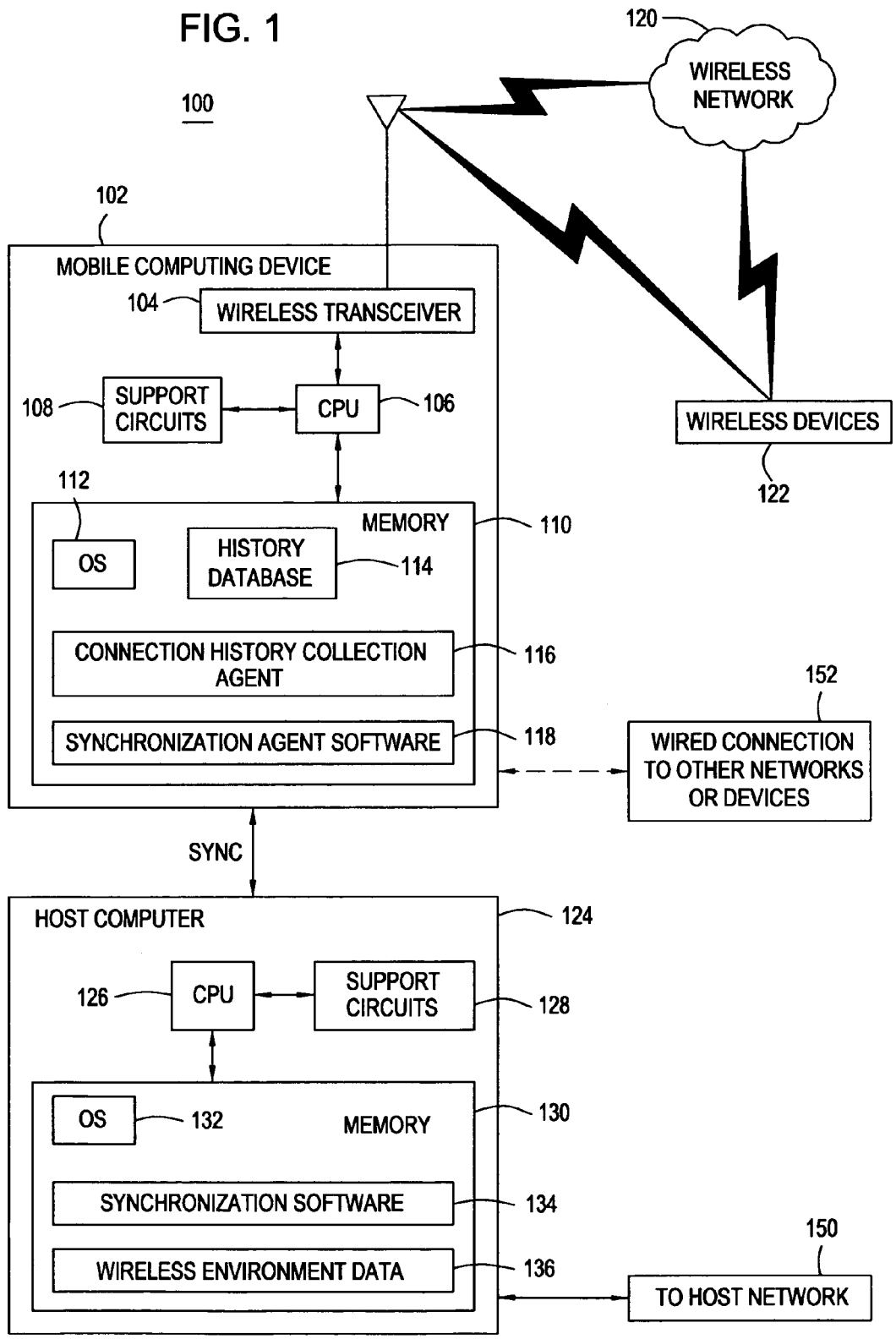
FIG. 1 is a block diagram of a computing environment that can benefit from the present invention.

FIG. 1 is a block diagram of a computing environment 100 that can benefit from the present invention. The computing environment 100 comprises a mobile computing device 102, e.g., a PDA, capable of communicating with one or more wireless devices 122 via a wireless network 120 and a host computer 124, i.e., a computer that may provide access to a host network 150 for the device.

The mobile computing device 102 comprises a wireless transceiver 104, a central processing unit (CPU) 106, support circuits 108 and a memory 110. The wireless transceiver 104 allows the mobile computing device 102 to communicate with other wireless devices 122 via such wireless communication standards as GPRS, BLUETOOTH and 802.11 a, b and g. The CPU 106 may include one or more commercially available microcontrollers or microprocessors. The support circuits 108 are well known circuits used to promote functionality of the CPU 108. Such circuits may include cache, power supplies, clock circuits, input/output interface circuits, and the like.

The memory 110 may comprise one or more of random access memory, read only memory, flash memory, removable disk storage, and the like. The memory 110 may store various software packages, such as an operating system (OS) software 112, a history database 114, a collection history agent 116 and synchronization agent software 118.

The connection history agent 116 collects information about the wireless network 120, the wireless devices 122 or any other network connection each time the mobile computing device 102 connects to the a network (e.g., wireless network 120 or other networks 152) or one of the wireless devices 122. The collected information, i.e., the connection history, is stored in the history database 114.

The history database 114 stores the connection history collected by the connection history agent 116. Each time the mobile computing device 102 connects a network or a wireless device, information about the connection is obtained by the connection history agent 116 and stored in the connection history database 114. The connection history database 114 may comprise an identifier for the wireless network 120, an identifier for one or more wireless devices 122, a length of a connection to the wireless network 120, and a record of files or information received during the connection to the wireless network 120 or the wireless devices 122.

The synchronization software 118 is software that transfers data between the mobile computing device 102 and the host computer 124. The synchronization software 118 synchronizes data between the mobile computing device 102 and the host computer 124, ensuring e-mail, calendar, contact and address book information and the like are uniform across both devices.

The host computer 124 is any computer such as a desktop or a laptop computer or server. Typically, the host computer 124 is connected to a larger conventional communications network such as host network 150. However, the host computer 124 may also be a standalone computer. The host computer 124 comprises a central processing unit (CPU) 126, support circuits 128 and a memory 130. The CPU 126 may include one or more commercially available microcontrollers. The support circuits 128 are well known circuits used to promote functionality of the CPU 126. Such circuits may include cache, power supplies, clock circuits, input/output interface circuits, and the like.

The memory 130 may comprise one or more of random access memory, read only memory, flash memory, removable disk storage, and the like. The memory 130 may store various software packages, such as an operating system (OS) software 132, synchronization software 134 and wireless environment data 136.

The synchronization software 134 utilized by the host computer 124 is similar to the synchronization software 118 utilized by the mobile computing device 102. The synchronization software 134 facilitates the transfer of data between the mobile computing device 102 and the host computer 124. The synchronization software 134 utilizes the wireless environment data 136 to determine whether or not the host computer 124 will be allowed to synchronize with the mobile computing device 102.

The wireless environment data 136 may comprise data identical to the history database 114, a subset of the history database 114, or a processed history database 114. The synchronization software 134 evaluated the wireless environment data to determine if the mobile computing device 102 should be granted access to the host computer 124. For example, the wireless environment data 136 may indicate the mobile computing device 102 did not connect to any unknown networks other than the host network 150 or to any other wireless device 122. Because the risk of virus or malware infection is low if the mobile computing device 102 has not accessed other networks or computers, the synchronization software 134 would allow the mobile computing device 102 to connect to the host computer 124 based on this information. However, if the wireless environment data 136 indicated the mobile computing device connected to a large number of different wireless networks and/or communicated with a large number of different wireless devices since the last synchronization, i.e., the mobile computing device 102 was very promiscuous, then the synchronization software 134 will not grant access to the mobile computing device 102 until a full virus and malware scan of the mobile computing device 102 is conducted. Thus, the present invention provides the benefit of reducing the risk of virus and malware transmission between the mobile computing device 102 and the host computer 124 and/or its network 150. The present invention also provides the additional benefit of not interfering with the operation of the mobile computing device 102 by requiring a time-consuming virus scan when the mobile computing device 102 has not left the confines of a secure network environment or connected to another wireless device 122. Alternatively, the host computer 124 could be any computer that connects to mobile devices. As such, before providing any network connection, whether synchronizing or not, the host computer 124 may process the history information as described herein.

Figure 2:
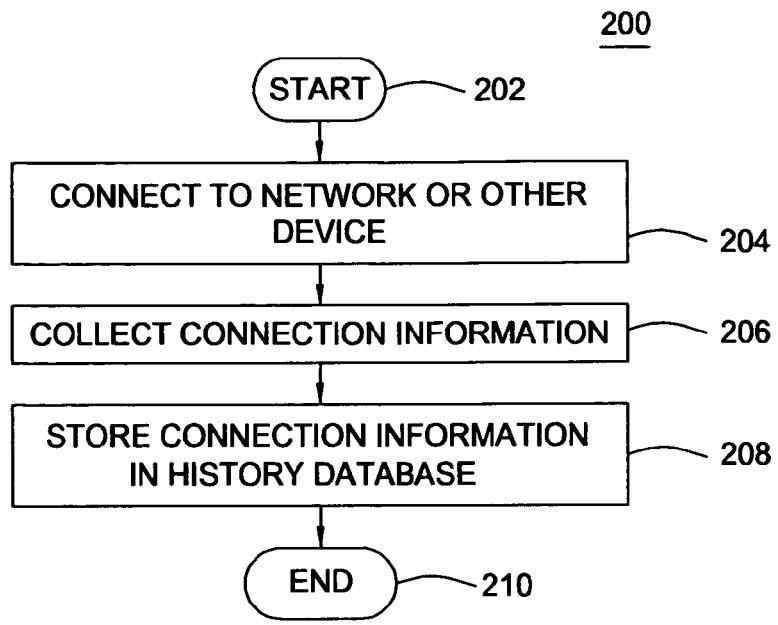
FIG. 2 is a flow diagram of a method for collecting a network history.

FIG. 2 is a flow diagram of a method 200 for collecting a connection history. The method 200 begins at step 202 and proceeds to step 204. At step 204, a mobile computing device 102 connects to a network or device via a network or directly.

At step 206, a connection history collection agent 116 collects information about the network and/or the devices the mobile computing device 102 connected to at step 204. The collected information may include an SSID for the network, a MAC address for the device, IP address of the domain, or any other information that can be used to identify the network and/or the device.

At step 208, the information collected at step 206 is stored in a history database 114. The history database 114 enables synchronization software 118 to evaluate a level of exposure for the mobile computing device 102 to viruses and other threats. The history database 114 also provides a mobility trail, i.e., an exact record of each network and device connected to by the mobile computing device 102. The method 200 ends at step 210.

Figure 3:
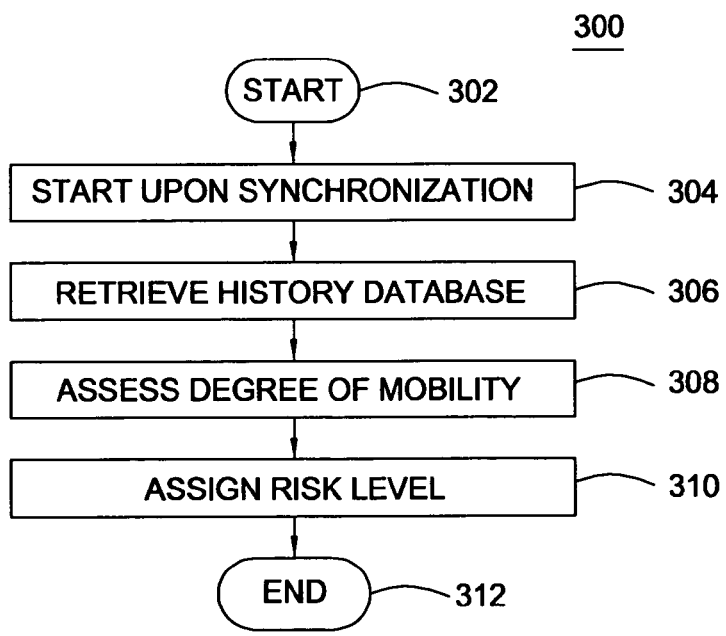
FIG. 3 is a flow diagram of a method for synchronizing a mobile computing device with a network computer.

FIG. 3 is a flow diagram of a method 300 for synchronizing a mobile computing device 102 with a host computer 124. The method 300 starts at step 302 and proceeds to step 304. At step 304, the mobile computing device 102 utilizes synchronization software 118 to begin synchronization with the host computer 124.

At step 306, the synchronization software 118 retrieves information stored in the history database 114. The history database 114 comprises an identifier for the wireless network 120, an identifier for one or more wireless devices 122, a length of a connection to the wireless network 120, and a record of files or information received during the connection to the wireless network 120 or the wireless devices 122.

At step 308, the synchronization agent software 118 processes the information stored in the history database 114 to assess a degree of mobility (promiscuity) enjoyed by the mobile computing device 102 since the last synchronization. The higher the degree of mobility, i.e., the greater the number of networks and devices connected to by the mobile computing device, the greater the risk posed by the mobile computing device 102 to the host computer 124 and host network 150.

At step 310, the synchronization agent software 118 assigns a risk level to synchronizing the mobile computing device 102 to the host computer 124. The risk level may be a numerical value such as 1 to 10, or a designation such as "low risk" and "high risk". The risk level is utilized by the synchronization agent software 118 in conjunction with an access policy to determine if synchronization between the mobile computing device 102 and the host computer 124 will be granted or if another process such as scanning the mobile computing device 102 with an anti-virus application must be performed first. Alternatively, the risk level can be assessed in the host computer 124. The method 300 ends at step 312.

Figure 4:
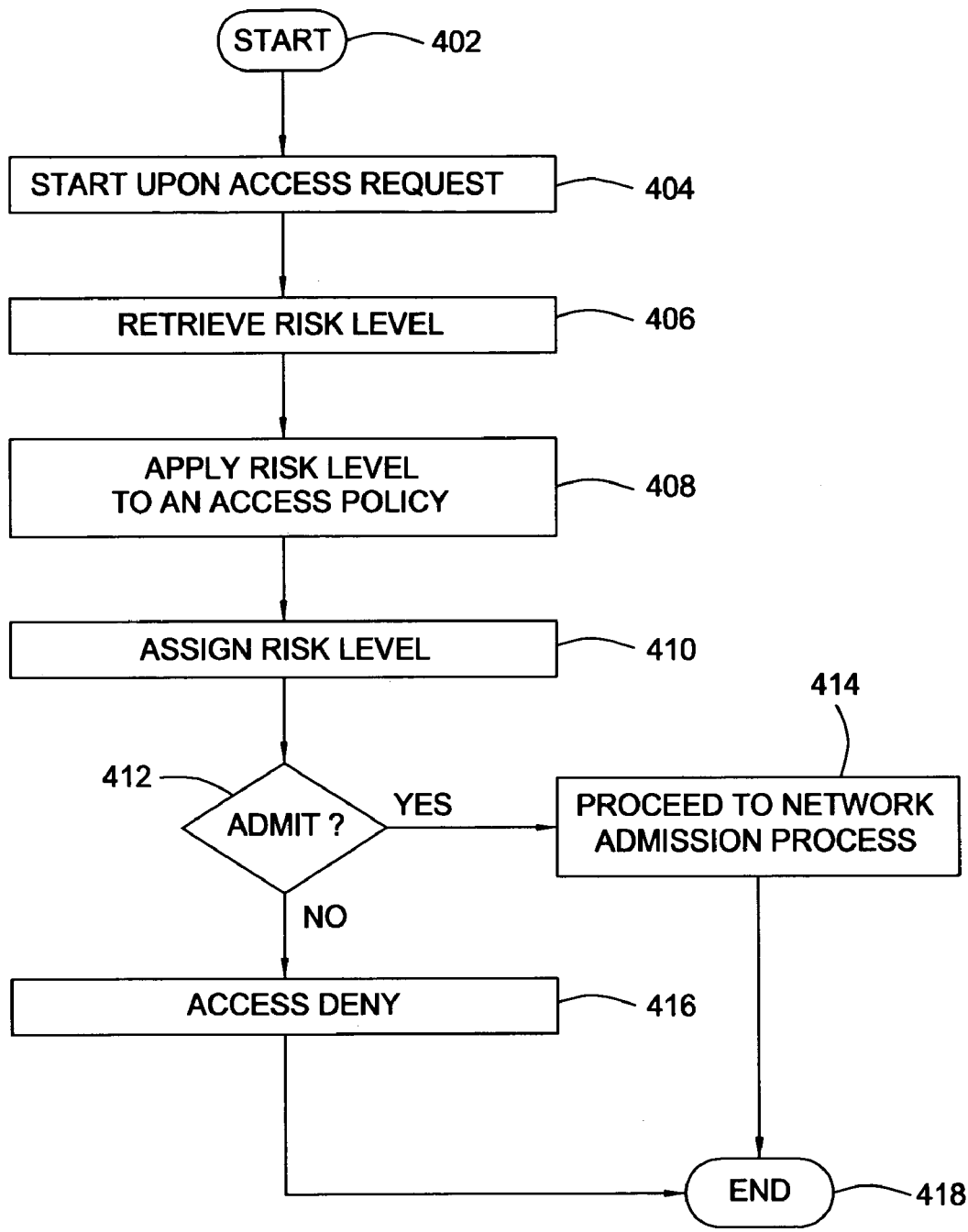
FIG. 4 is a flow diagram of a method for assessing a risk level of a mobile computing device and FIG. 5 is a flow diagram of a method for auditing a history of a mobile computing device.

FIG. 4 is a flow diagram of a method 400 for assessing a risk level of a mobile computing device 102. The method 400 starts at step 402 and proceeds to step 404. At step 404, a host computer 124 receives a synchronization request or a request to access the host computer 124 or the host network 150 from the mobile computing device 102. At step 406, the host computer 124 retrieves a risk level from the mobile computing device 102. The risk level may be transmitted from the mobile computing device 102 to the host computer 124 and stored in a wireless environment data 136 file. The host computer 124 may also compute the risk level based upon information provided by the mobile computing device 102. The wireless environment data 136 may comprise data identical to a history database 114, a subset of the history database 114, a numerical value, .e.g., 1 to 10, indicating a risk level or a risk level designation, e.g., "low risk" or "high risk".

The host computer 124 applies the risk level to an access policy within synchronization software 134. The access policy dictates whether the mobile computing device 102 will be allowed to synchronize with the host computer 124 or whether an appropriate action, e.g., a virus scan must be performed on the mobile computing device 102 prior to synchronization.

At step 410, the mobile computing device 102 is scanned in accordance with the access policy. If the mobile device 102 remained stationary, i.e., the mobile device 102 did not connect to any foreign networks 120 or any other wireless devices 122, then the mobile device 102 will not require a virus scan. If the risk level is high, then mobile device 102 will require a virus scan.

At decision step 412, the method 400 determines whether to admit the mobile computing device 102 to the network computer based on the risk level assigned to the mobile computing device 102, the access policy and the result of the virus scan. If the decision is yes, then the method 400 proceeds to step 414. At step 414, the host computer 124 admits the mobile computing device 102 via a network admission process. If the decision is no, then the method proceeds to step 416. At step 416, the method 400 denies access to the mobile computing device 102 and/or takes action to scan the mobile computing device 102 for a virus or malware infection. The method 400 ends at step 418.

Figure 5:
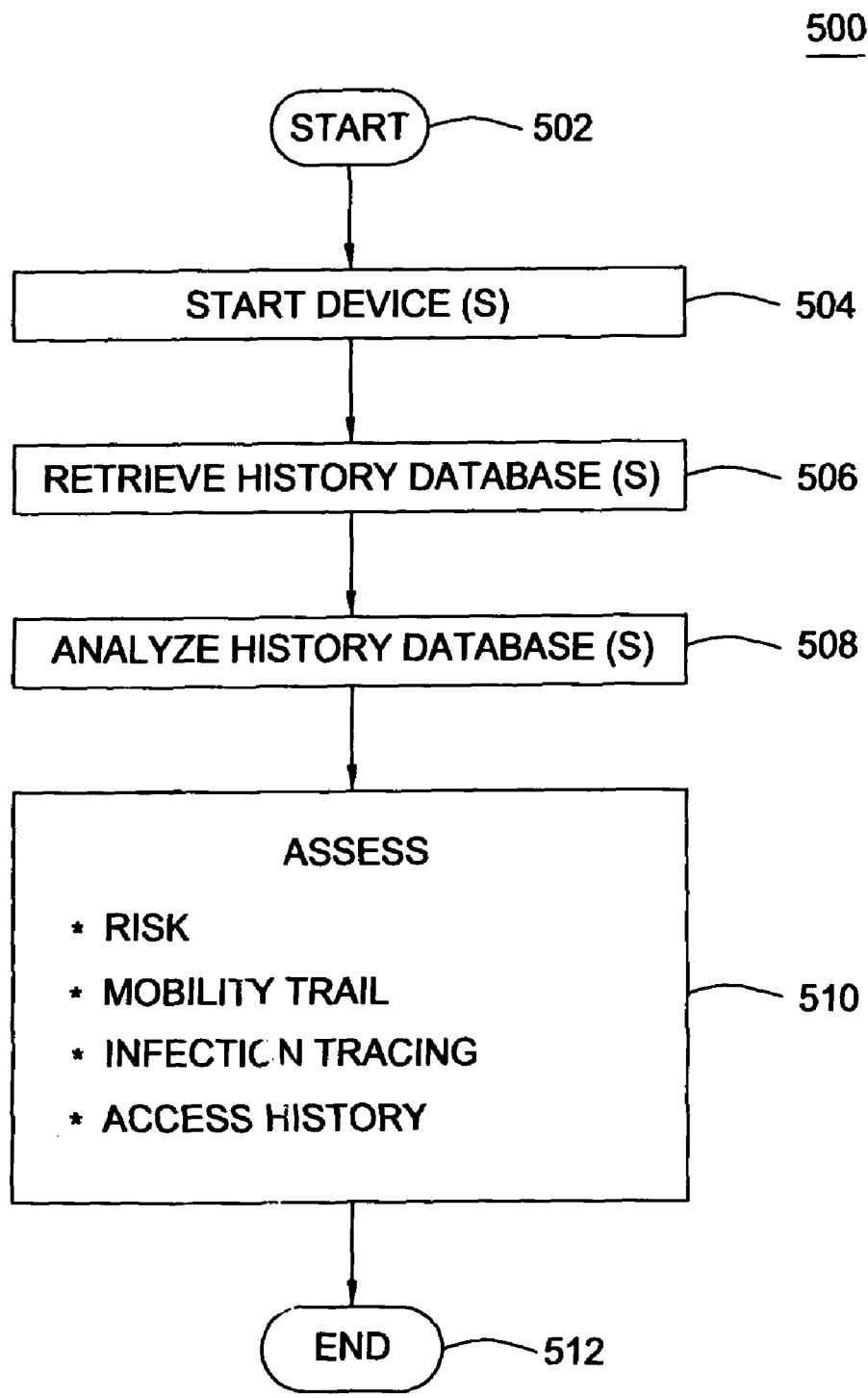

FIG. 5 is a flow diagram of a method 500 for auditing a mobility history of a mobile computing device 102. The method 500 can be used for assessing risk, generating a mobility trail, tracing a virus infection and generating an access history. The method 500 starts at step 502 and proceeds to step 504. At step 504, a user selects the mobile computing device 102 to audit. At step 508, the user retrieves a history database 114 from the mobile computing device. The history database 114 is maintained by a connection history collection agent 116. The history database 114 provides a mobility trail, i.e., an exact record of each network and wireless device connected to by the mobile computing device 102. At step 508, the user analyzes the history database 114. The analysis may be performed by auditing software, a component of the synchronization software 118 or manually by the user. At step 510, the user utilizes the analysis to assess a risk level, i.e., how often was the mobile computing device 120 exposed to an unsecured network and how many other wireless devices connected to the mobile computing device 120. The user can also use the history database to track exactly where the mobile computing device 120 has been, i.e., a mobility trail. The mobility trail allows the user to perform infection tracing. Infection tracing allows the user to determine a point of entry into a computing device or network for a computer virus or other malware. The history database 114 also provides an access history, i.e., identifiers for each network 120 and each device that connected or attempted to connect to the mobile computing device 120 and a record of data transferred between the mobile computing device 120 and each wireless network 120 and each wireless device 122. The method 500 ends at step 512.

The present invention provides the benefit of securing access between a mobile computing device and a host computer in a manner that does not negatively impact the use of the mobile computing device by a user. A connection history collection agent maintains a history database; synchronization software processes the history database to assess a risk level, and based upon the risk level synchronization or other connection between the mobile computing device and the network computer is granted in accordance with an access policy. If the risk level is high, then the synchronization software may require an anti-virus or security scan first be performed before allowing synchronization or other connection between the mobile computing device and the network computer. Because the scan is performed only when the risk level is high, the present invention does not negatively impact user experience. Therefore, the mobile computing device is less likely to spread computer viruses and malware to the host computer.

While the foregoing is directed to embodiments of the present invention, other and further embodiments of the invention may be devised without departing from the basic scope thereof, and the scope thereof is determined by the claims that follow.

The invention claimed is:

1. A method for securing access between a mobile computing device and a host computer comprising:
   upon a connection by the mobile computing device to a network or a device, recording the connection in a history database, where the history database comprises a record of each network or device connected to by the mobile computing device;
   processing the history database by assigning a risk level to the mobile computing device, the risk level being based upon a number of different devices and networks to which the mobile computing device has previously been connected, and indicating a risk of the mobile computing device transmitting at least one of a virus or malware;
   determining that the risk level is above a certain risk level;
   scanning the mobile computing device with an antivirus software application in response to the determined risk level;
   creating a mobility trail for the mobile computing device comprising a record of each network and device connected to by the mobile computing device based upon history database; and
   generating an access history for the mobile computing device, wherein the access history comprises at least one of identifier information associated with each network and device connected to by the mobile computing device and a record of data transferred between the mobile computing device and each network and device connected to by the mobile computing device.

2. The method of claim 1 further comprising recording to the history database at least one of an identifier for the network, an identifier for one or more devices, a length of a connection to the network, and a record of files or information received during the connection to the network or the devices.

3. The method of claim 1 further comprising applying the risk level to an access policy.

4. The method of claim 3 where the risk level is below a certain risk level and the mobile computing device is granted access to the host computer.

5. The method of claim 1 further comprising tracing a computer virus infection based upon the history database.

6. The method of claim 1 wherein generating the access history for the mobile computing device is based upon the history database.

7. The method of claim 1 wherein the risk level is based upon the number of different devices and networks to which the mobile computing device has connected to since the last synchronization.

8. A non-transitory computer-readable storage medium having stored thereon a plurality of instructions, the plurality of instructions including instructions which, when executed by a processor, cause the processor to perform a method comprising:
   upon a connection by the mobile computing device to a network or a device, recording the connection in a history database;
   processing the history database by assigning a risk level to the mobile computing device, the risk level being based upon a number of different devices and networks to which the mobile computing device has previously been connected, and indicating a risk of the mobile computing device transmitting at least one of a virus or malware;
   determining that the risk level is above a certain risk level;
   scanning the mobile computing device with an antivirus software application in response to the determined risk level;
   creating a mobility trail for the mobile computing device comprising a record of each network and device connected to by the mobile computing device based upon history databases and
   generating an access history for the mobile computing device, wherein the access history comprises at least one of identifier information associated with each network and device connected to by the mobile computing device and a record of data transferred between the mobile computing device and each network and device connected to by the mobile computing device.

9. The non-transitory computer-readable storage medium of claim 8 wherein the method performed by the processor further comprises recording to the history database at least one of an identifier for the network, an identifier for one or more devices, a length of a connection to the network, and a record of files or information received during the connection to the network or the devices.

10. The non-transitory computer-readable storage medium of claim 8 wherein the method performed by the processor further comprises applying the risk level to an access policy.

11. The non-transitory computer-readable storage medium of claim 8 wherein the method performed by the processor further comprises tracing a computer virus infection based upon the history database.

12. The non-transitory computer-readable storage medium of claim 8 wherein the method performed by the processor further comprises generating the access history for the mobile computing device based upon the history database.

13. The non-transitory computer-readable storage medium of claim 8 wherein the risk level is based upon the number of different devices and networks to which the mobile computing device has connected to since the last synchronization.

14. A system for securing access between a mobile computing device and a host computer comprising:
   the mobile computing device comprising a connection history collection agent configured to collect information about a computing environment; and
   the host computer comprising wireless environment data derived from the collected information received from the connection history collection agent of the mobile computing device, wherein the host computer is configured to:
      use the wireless environment data to determine a risk level based at least in part upon a number of different devices and networks to which the mobile computing device has previously been connected;
      indicate a risk of the mobile computing device transmitting at least one of a virus or malware;
      determine, based on the risk level, whether synchronization between the mobile computing device and the host computer will be allowed;
      scan the mobile computing device with an antivirus application in response to the determined risk level; and
      create a mobility trail for the mobile computing device comprising a record of each network and device connected to by the mobile computing device based upon history database; and
      generate an access history for the mobile computing device, wherein the access history comprises at least one of identifier information associated with each network and device connected to by the mobile computing device and a record of data transferred between the mobile computing device and each network and device connected to by the mobile computing device.

15. The system of claim 14 further comprising at least one network where the connection history collection agent records a connection to the at least one network upon connection to the at least one network by the mobile computing device.

16. The system of claim 14 further comprising at least one device where the connection history collection agent records a connection to the at least one device upon connection to the at least one device by the mobile computing device.

17. The system of claim 14 wherein the host computer comprising wireless environment data derived from the collected information where the host computer further uses the number of different devices and networks to which the mobile computing device has connected to since the last synchronization to determine a risk level indicating a risk of the mobile computing device transmitting at least one of a virus or malware.

* * * * *